(12) United States Patent
Liu

(10) Patent No.: US 7,848,581 B2
(45) Date of Patent: Dec. 7, 2010

(54) SYSTEM AND METHOD FOR DECODING AND VIEWING OF IMAGE FILES

(75) Inventor: Yi-Lang Liu, Changhua County (TW)

(73) Assignees: Taiwan Semiconductor Manufacturing Company, Ltd., Hsin-Chu (TW); Global Unichip Corp., Hsinchu (TW)

(*) Notice: Subject to any disclaimer, the term of this patent is extended or adjusted under 35 U.S.C. 154(b) by 944 days.

(21) Appl. No.: 11/715,230

(22) Filed: Mar. 7, 2007

(65) Prior Publication Data

US 2008/0219569 A1 Sep. 11, 2008

(51) Int. Cl.
G06K 9/36 (2006.01)
(52) U.S. Cl. ...................................................... 382/232
(58) Field of Classification Search ................. 382/232, 382/236, 239–240, 243–250; 375/240, 240.2–240.23; 348/384.1, 394.1–395.1, 404.1, 408.1–410.1, 348/430.1
See application file for complete search history.

(56) References Cited

U.S. PATENT DOCUMENTS 6,084,475 A    7/2000  Rincon-Mora
6,445,828 B1 * 9/2002  Yim ............................ 382/250
6,608,867 B2 * 8/2003  Zhong et al. .............. 375/240.2
6,940,336 B2   9/2005  Bakker
7,039,247 B2 * 5/2006  Iwamura ..................... 382/236
7,346,220 B2   3/2008  Jeffrey et al.
7,471,834 B2 * 12/2008 Sull et al. .................... 382/232

FOREIGN PATENT DOCUMENTS

| JP | 63-026781 A   | 2/1988 |
| JP | 02-082370 A   | 3/1990 |
| JP | 2005045797 A  | 2/2005 |

* cited by examiner

Primary Examiner—Jose L Couso
(74) Attorney, Agent, or Firm—Slater & Matsil, L.L.P.

(57) ABSTRACT

System and method for memory efficient decode and viewing of compressed image files. A preferred embodiment comprises a decoder coupled to a data input, a resize unit coupled to the decoder, a memory coupled to the resize unit, and a reorder data unit coupled to the memory. The decoder decompresses image data that is provided by the data input, while the resize unit resizes the decompressed image data from a first size to a second size. The memory stores the resized image data and the reorder data unit rearranges the image data into a format suitable for display. By resizing the image data prior to subsequent processing, memory requirements (such as storage space and bandwidth) are reduced.

19 Claims, 4 Drawing Sheets

SYSTEM AND METHOD FOR DECODING AND VIEWING OF IMAGE FILES

TECHNICAL FIELD

The present invention relates generally to a system and a method for displaying images, and more particularly to a system and a method for memory efficient decoding and viewing of compressed image files.

BACKGROUND

In today's world, full color images have replaced simple diagrams, sketches, and black and white images in documents, web pages, and so forth. Full color images are preferred due to the increased amount of information that they can provide, along with their better appearance. However, full color images may be significantly larger in size than the simple diagrams, sketches, and black and white images. Their larger size may make the transmission of documents containing the full color images time consuming and unwieldy.

Therefore, many image compression techniques and algorithms have been developed to reduce the size of full color images. A technique referred to as JPEG image compression uses a lossy data compression algorithm to significantly reduce the size of full color images while retaining good image quality. An advantage of JPEG image compression is that image quality can readily be traded off for reduced image size.

With reference now to FIGS. 1a and 1b, there are shown diagrams illustrating data arrangement of one commonly used form of JPEG image compression and a high-level block diagram of a commonly used JPEG image decoder and viewer 150. The diagram shown in FIG. 1a illustrates the arrangement of data in a JPEG compressed image with a 4:2:2 downsampling factor. Since the human eye can see more detail in the Y component (luma component) of an image than in either the Cb (blue chroma component) and the Cr (red chroma component) components, JPEG encoders may be designed to more effectively compress images by exploiting this. In 4:2:2 downsampling, data along the Cb and Cr components are reduced by a factor of two. Other variations of JPEG compression may be 4:4:4 (no downsampling) and 4:2:0 (downsampling by a factor of two along all components).

The diagram shown in FIG. 1a illustrates data associated with an image arranged into three groups. A first group 105 contains Y component data, a second group 110 contains Cb component data, and a third group 115 contains Cr component data. When compressed, the data of the image is stored in 8×8 blocks so that two consecutive blocks (block 106 and block 107) contain Y component data. The blocks 106 and 107 may then be followed by a single block (block 111) that contains Cb component data. The block 111 may then be followed by another single block (block 116) that contains Cr component data. This ordering is continued for all of the image's data. The processing of the data typically requires the accessing of the data contained in the blocks in the following order: block 106, block 107, block 111, and block 116. This ordered access to the data may continue until all of the data for the image has been accessed.

The JPEG image decoder and viewer 150 shown in FIG. 1b includes a JPEG decoder 155, which may be responsible for implementing a JPEG decoding algorithm required to decode the JPEG compressed image for viewing purposes. The JPEG decoder 155 converts the compressed image file back to an image file of the same size as the original image file. The JPEG image decoder and viewer 150 also includes a memory 160 that can be used to store the JPEG image as well as provide buffer space required during the JPEG decoding and viewing. Also included is a reorder address generator 165 used to reorder and scale the JPEG image's data, a reorder data unit 170 used to reorder the JPEG image's data into an order necessary for display purposes, and a display encoder/controller 175 used to display the reordered JPEG image data on a display, such as a CRT terminal, an LCD display, a television, and so forth.

One disadvantage of the prior art is that the JPEG image decoding and viewing requires a buffer that is on the order of the largest supported image size since the JPEG image decoding takes place prior to displaying the image. For full color images (24 bits of color information per pixel), the buffer may need to be as large as 12.3 gigabytes to support the maximum JPEG supported image size.

SUMMARY OF THE INVENTION

These and other problems are generally solved or circumvented, and technical advantages are generally achieved, by preferred embodiments of the present invention which provides a system and a method for memory efficient decoding and viewing of compressed image files.

In accordance with a preferred embodiment of the present invention, a circuit is provided. The circuit includes a decoder coupled to a data input, a resize unit coupled to the decoder, a memory coupled to the resize unit, and a reorder data unit coupled to the memory. The decoder decompresses data provided by the data input and the resize unit resizes the decompressed data from a first size to a second size, while the memory stores the resized data and the reorder data unit rearranges the data into a format suitable for display In accordance with a preferred embodiment of the present invention, a method for viewing an image, where the image contains compressed image data, is provided. The method includes uncompressing the compressed image data, resizing the uncompressed image data along a first axis, and resizing the uncompressed image data along a second axis, where the uncompressed image data has been resized along the first axis. The method also includes storing the uncompressed image data and displaying the uncompressed image data, where the uncompressed image data has been resized along the first axis and the second axis.

In accordance with another preferred embodiment of the present invention, a method for resizing a first group of pixels of size M to a second group of pixels of size N. The method includes processing a first pixel from the first group of pixels, incrementing a counter by N. The method also includes, in response to a determining that a value in the counter is greater than or equal to M, computing a pixel to be a member of the second group of pixels and subtracting M from the value in the counter. The method additionally includes repeating the processing, the incrementing, the determining, the subtracting, and the computing for remaining pixels in the first group of pixels.

An advantage of a preferred embodiment of the present invention is that the buffer size requirement is significantly reduced. Therefore, the costs associated with a JPEG decoder and viewer can be reduced.

A further advantage of a preferred embodiment of the present invention is that the reduction in memory requirements also reduces the need to move a lot of data to and from the memory (buffer). Therefore, the JPEG decoding and viewing may occur more rapidly. This can alleviate memory bandwidth requirements, and the JPEG decoding and viewing may occur more rapidly.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a decoder and viewer for JPEG compressed image files. The invention may also be applied, however, to other compressed files wherein it is necessary to decompress a file in its entirety before accessing the content of the files.

Figure 1A:
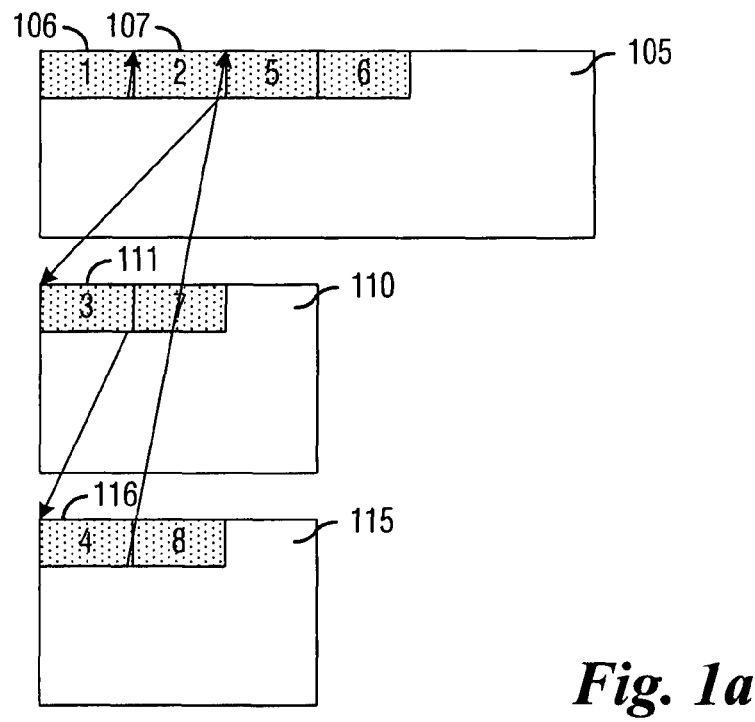
FIGS. 1a and 1b are diagrams of a data arrangement of a commonly used form of JPEG image compression and a high-level block diagram of a JPEG decoder and viewer.
Figure 1B:
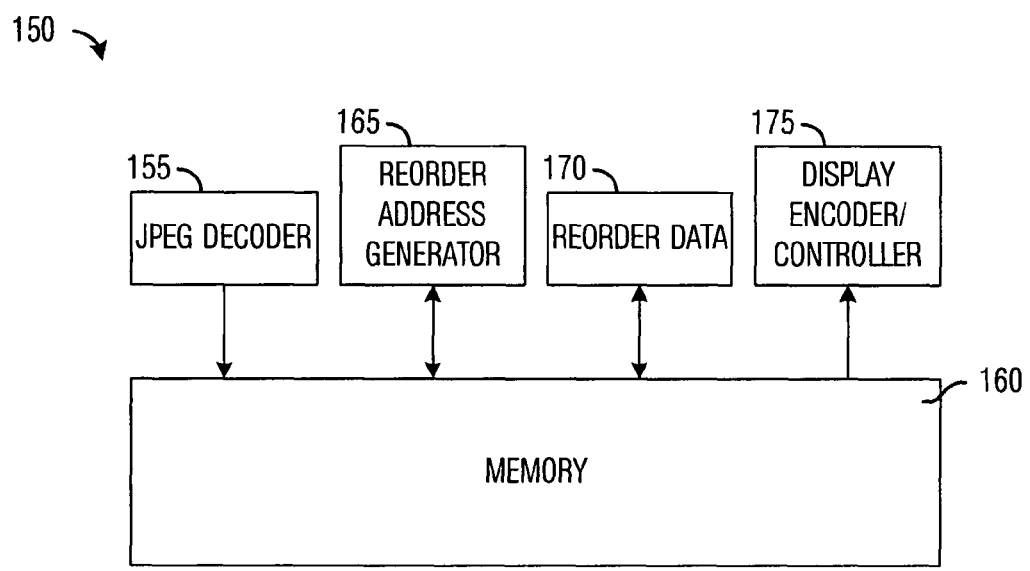
Figure 2A:
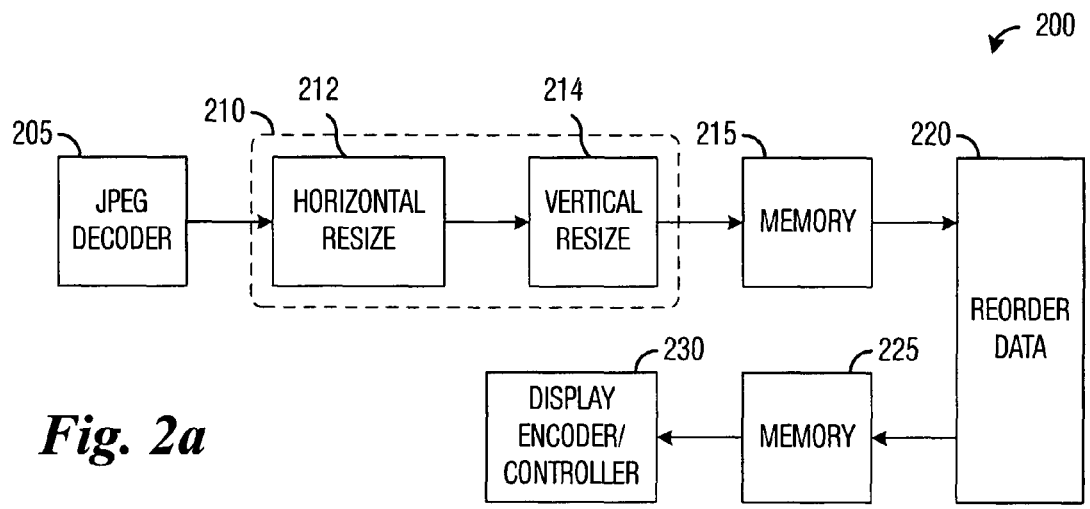
FIGS. 2a and 2b are diagrams of a high-level block diagram of a JPEG decoder and viewer and a detailed view of a resizing block of a JPEG decoder and viewer.
Figure 2B:
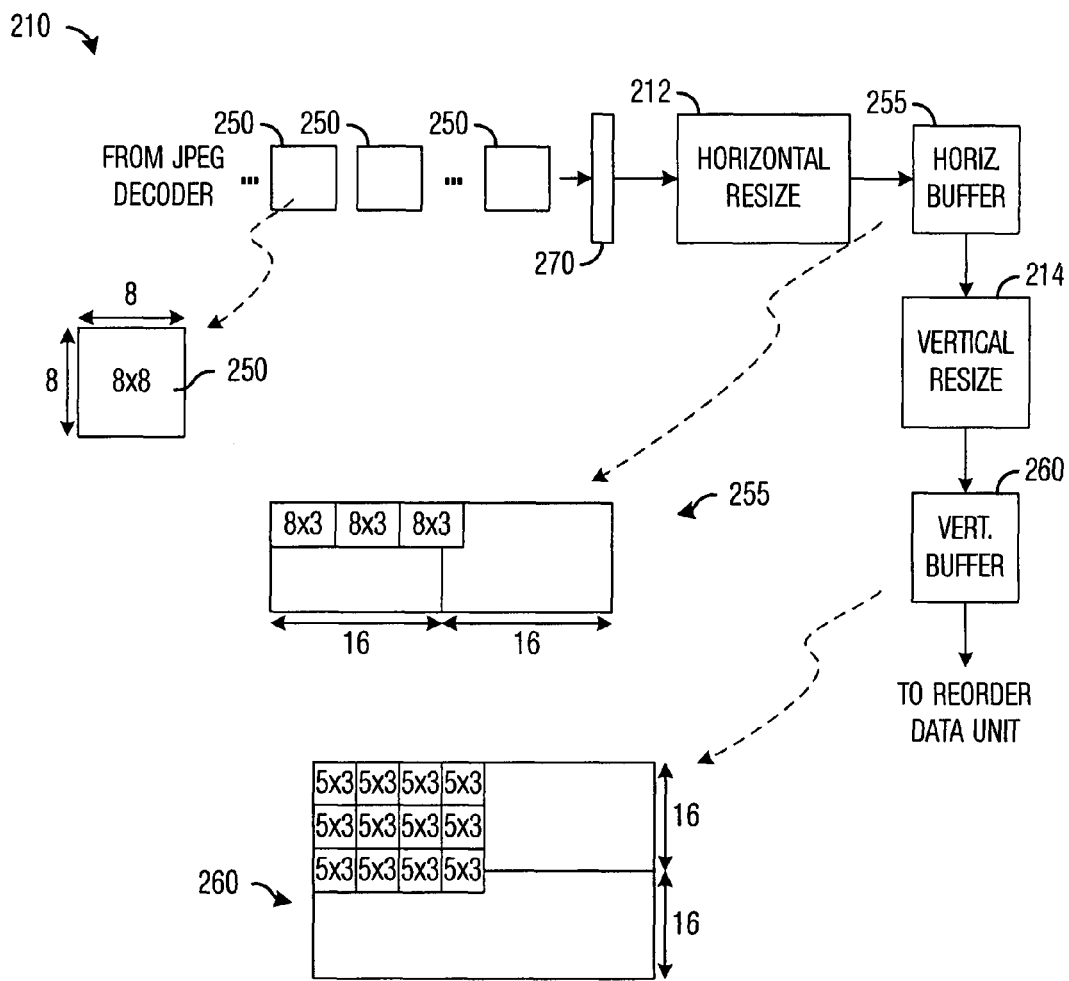

With reference now to FIGS. 2a and 2b, there are shown diagrams illustrating a high-level block diagram of a JPEG decoder and viewer 200 and a detailed view of a resizing block of the JPEG decoder and viewer 200. The JPEG decoder and viewer 200 includes a JPEG decoder 205 that may be used to decode the compressed image data contained in the JPEG compressed image file. The decompressed image data may then be provided to a resize unit 210 that may be used to change the uncompressed image to a resolution suitable for displaying. For example, if the original image size was 512 pixels by 512 pixels in size and for display purposes, every image is to be reduced by 75 percent, then the resize unit 210 will perform the resizing of the 512×512 original image into a 128×128 scaled image. The resize unit 210 may include a horizontal resize unit 212 and a vertical resize unit 214, which may be responsible for resizing the image along the respective axes. The resized image may then be stored in a memory 215 (or a buffer), such as an SDRAM memory.

The resized image (stored in the memory 215) may then be provided to a reorder data unit 220. The reorder data unit 220 may be used to reorder the data that may be stored in the JPEG data order into an order that is appropriate for display. For example, prior to data reordering, the data may be in the order of 2 Y component blocks, 1 Cb component block, and 1 Cr component block, and so on. After the data reordering, the data may be in the order of Y component, Cb component, Cr component, and so forth. The reordered data may be stored in a memory 225 prior to being provided to a display encoder/controller 230 for any necessary encoding needed on the data to display the image.

The diagram shown in FIG. 2b provides a detailed view of the resize unit 210 of the JPEG decoder and viewer 200. As discussed above, blocks of decompressed image data (such as block 250) may be provided to the resize unit 210 of the JPEG decoder and viewer 200. According to the JPEG technical standards, the blocks 250 are of size 8×8. However, blocks of other size are possible and the discussion of the 8×8 blocks should not be construed as being limiting to either the scope or the spirit of the present invention.

The blocks 250 undergo a horizontal resizing in the horizontal resize unit 212. For example, a block of size 8×8 may be resized to a block of size 8×3. Again, the value 8×3 is intended for discussion purposes and the horizontal resize unit 212 can resize the input block to a wide range of sizes. The resized blocks may then be stored in a horizontal buffer 255. The horizontal resize unit 212 can continue to resize blocks arriving at its input and storing the resized blocks in the horizontal buffer 255.

When the horizontal buffer 255 is full to at least a specified amount, the contents of the horizontal buffer 255 may be provided to the vertical resize unit 214 wherein the contents of the horizontal buffer 255 are vertically resized. For example, when the horizontal buffer 255 is filled to a point wherein more than 16 pixels worth of information is contain therein, the contents of the horizontal buffer may be provided to the vertical resize unit 214, wherein a block of size 8×3 may be resized to a block of size 5×3. Again, the value 5×3 is intended for discussion purposes and the vertical resize unit 214 can resize the input block to a wide range of sizes. After vertical resizing, the output of the vertical resize unit 214 may be stored in a vertical buffer 260. Once the vertical buffer 260 is filled to at least a specified amount, for example, more than 16 lines of pixel information, the contents of the vertical buffer 260 may be provided to the reorder data unit 220. Although the diagram and the description describes the horizontal resizing occurring prior to the vertical resizing, in alternative embodiments, the vertical resizing may occur prior to the horizontal resizing.

Between the JPEG decoder 205 and the horizontal resize unit 212 may be residual registers 270. The residual registers 270 may be used to store pixel values when there is resizing (scaling) that occurs across block boundaries. For example, when there are an insufficient number of pixels to perform a resizing operation, the pixels may be held in the residual registers 270 until additional pixels arrive to provide a needed number of pixels to perform the resizing operation. The size of the residual registers 270 may be dependent upon the amount of resizing performed.

Figure 3:
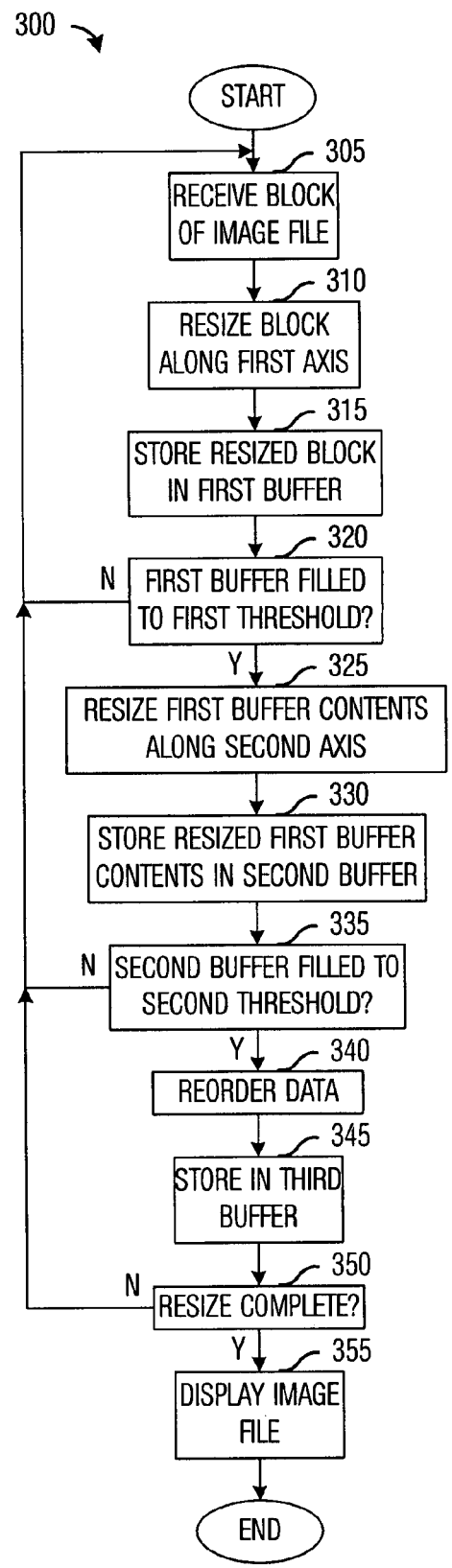
FIG. 3 is a flow diagram of a sequence of events in decoding and displaying a JPEG compressed image.

With reference now to FIG. 3, there is shown a diagram illustrating a sequence of events 300 in the decoding and displaying of a JPEG compressed image. The sequence of events 300 may be descriptive of the operations occurring in a JPEG decoder and viewer, such as the JPEG decoder and viewer 200 (FIG. 2a). The decoding and viewing of a JPEG compressed image may begin with the reception of a block of the JPEG compressed image file (block 305). According to the JPEG technical standards, a block is of size 8×8 pixels. The block may then be resized along a first axis by a first resize unit, for example, along the horizontal axis (block 310) and stored in a first buffer (block 315).

The reception of the blocks of the image file, the resizing, and the first storing may continue. Once the first buffer is filled to a point that exceeds a first threshold (block 320), the contents of the first buffer may be provided to a second resizing unit that will resize the blocks along a second axis, for example, the vertical axis (block 325). The output of the second resize unit may be stored in a second buffer (block 330). The second resizing and the second storing may continue until the second buffer is empty.

Once the second buffer is filled to a point that exceeds a second threshold (block 335), the blocks contained in the second buffer may be provided to a reorder data unit, where the blocks may be reordered for display purposes (block 340) and the reordered data may be stored in a third buffer (block 345). The reordering and the third storing may continue until the resizing of the image data is complete (block 350). Once the resizing the complete, the resized image data may be displayed (block 355).

Figure 4A:
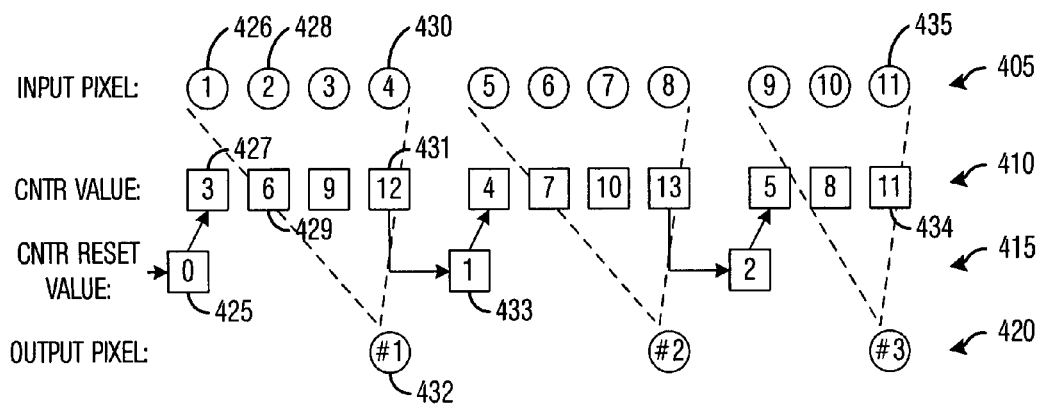
FIGS. 4a and 4b are diagrams of a technique used in the resizing of pixels and a flow diagram of an algorithm for resizing pixels.
Figure 4B:
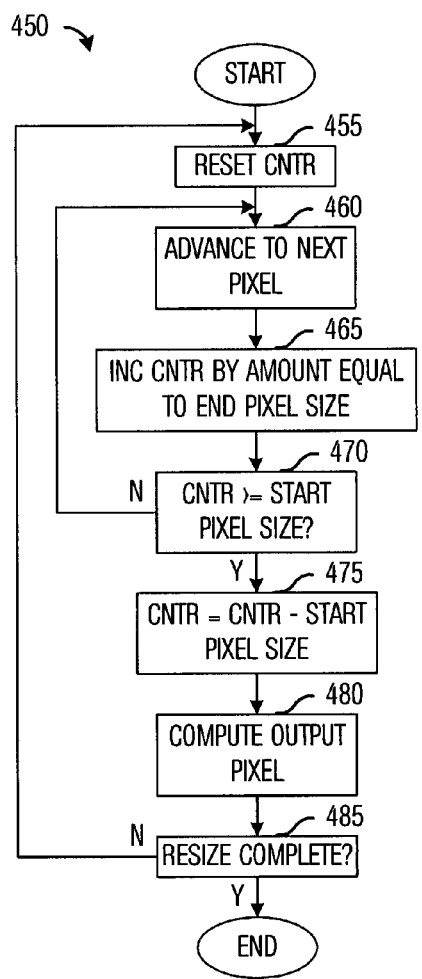

With reference now to FIGS. 4a and 4b, there are shown diagrams illustrating a technique used in resizing pixels and an algorithm for resizing pixels. The diagram shown in FIG. 4a illustrates a technique for resizing pixels in an image from starting pixel size to an ending pixel size, for example, resizing 11 pixels (starting pixel size) to three pixels (ending pixel size). The resizing of pixels will replace groups of 11 pixels with groups of three pixels. Although the discussion below will discuss the resizing of groups of 11 pixels into groups of three pixels, the technique describe can resize an arbitrary starting pixel size to an arbitrary ending pixel size. Therefore, the discussion should not be construed as being limiting to either the scope or the spirit of the present invention.

A first sequence of numbers 405 displays a group of pixels representing starting pixels, as shown, the group of starting pixels is made up of 11 pixels. The technique makes use of a counter that increments in steps equal to the ending pixel size and initially starts with a value of zero. A second sequence of numbers 410 displays a sequence of numbers representing the counter value as the resizing technique operates and a third sequence of numbers 415 displays a sequence of numbers representing counter reset values. Finally, a fourth sequence 420 displays a group of pixels representing ending pixels, as shown, the group of ending pixels is made up of three pixels.

The counter may begin with an initial value equal to zero (0) 425 and as a first starting pixel 426 is processed, the counter may increment to a value equal to three (3) 427. Then, as a second starting pixel 428 is processed, the counter may increment to a value equal to six (6) 429. The counter continues to increment in steps equal to the ending pixel size until the counter may be equal to or greater than the starting pixel size. The counter exceeds the starting pixel size (11) when a fourth starting pixel 430 is processed, with a value equal to 12 (block 431).

Once the counter reaches a value that may be equal to or greater than the starting pixel size, a final pixel may be output, for example, a first final pixel 432. The final pixel may be an average of the starting pixels processed (the first pixel 426, the second pixel 428, a third pixel, and the fourth pixel 430), for example. Alternatively, the final produced may be some weighted average (or some other weighting function) of the starting pixels processed. With the first final pixel 432 produced, the counter may be reset. The counter may be reset to a value that is equal to a current value of the counter (12) minus the starting pixel size (11) or one (1), shown as block 433.

The processing of the starting pixels may continue and each time that the counter reaches a value that may be equal to or greater than the starting pixel size, another final pixel may be output. The processing of the starting pixels may complete when the counter reaches a value that may be equal to the starting pixel size (11), shown as block 434, reached when an eleventh starting pixel 435 is processed.

The diagram shown in FIG. 4b illustrates an algorithm 450 for resizing pixels. The algorithm 450 may be used to resize a group of starting pixels to a group of ending pixels, with the resizing replacing a group of starting pixels of size equal to starting pixel size with a group of ending pixels of size equal to ending pixel size.

The resizing of the pixels may begin with a resetting of a counter, with an initial value preferably being equal to zero (0) (block 455). The resizing may then continue with the processing of an initial starting pixel (block 460). The processing may involve computing a running average of the starting pixel value. Alternatively, the processing may compute a weighted average of the starting pixel value. As the starting pixel is processed, the counter may be incremented by a value that may be equal to the ending pixel size (block 465). After the counter has been incremented, a check of the counter value may be performed (block 470). The check may determine if the counter value may be equal to or greater than the starting pixel size. If the counter value is not equal to or greater than the starting pixel size, resizing may continue by advancing to a next starting pixel and incrementing the counter.

If the counter value is equal to or greater than the starting pixel size, then the counter may be reinitialized with a value that is equal to the counter value minus the starting pixel size (block 475) and an ending pixel may be computed and outputted (block 480). The computing of the ending pixel may involve computing an average value of the starting pixels processed or some other mathematical combination of the starting pixels processed. After the computing and outputting of the ending pixel, a check may be performed to determine if the resizing is complete (block 485). If the resizing is not complete, the resizing may reset the counter value and repeat.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A circuit comprising:
a decoder coupled to a data input, the decoder configured to decompress data provided by the data input and provide a sequence of blocks of decompressed data;
a horizontal resize unit coupled to the decoder, the horizontal resize unit resizing each block of decompressed data in sequence along a horizontal axis, thereby creating a sequence of horizontally resized blocks of decompressed data; and
a vertical resize unit coupled to the horizontal resize unit, the vertical resize unit resizing the sequence of horizontally resized blocks along a vertical axis, thereby creating a sequence of horizontally and vertically resized blocks of decompressed data;
a memory coupled to the vertical resize unit, the memory to store the sequence of horizontally and vertically resized blocks of decompressed data; and
a reorder data unit coupled to the memory, the reorder data unit configured to rearrange the sequence of horizontally and vertically resized blocks of decompressed data into a format suitable for display.

2. The circuit of claim 1, further comprising a second memory coupled to the reorder data unit, the second memory to store the rearranged data.

3. The circuit of claim 2, further comprising a display encoder coupled to the second memory, the display encoder configured to encode the rearranged data into a form compatible with a display device used to display the data.

4. The circuit of claim 2, wherein the memory and the second memory comprise SDRAM buffers.

5. The circuit of claim 1, further comprising a horizontal buffer coupled between the horizontal resize unit and the vertical resize unit, the horizontal buffer to store the horizontally resized blocks of decompressed data.

6. The circuit of claim 1, wherein the memory comprises a vertical buffer, the vertical buffer to store the horizontally and vertically resized blocks of decompressed data.

7. The circuit of claim 1, further comprising a residual register coupled between the decoder and the horizontal resize unit, the residual register to store pixel values prior to resizing when there is an insufficient number of data to perform the resizing.

8. A method for viewing an image, wherein the image contains compressed image data, the method comprising:
uncompressing by a processor the compressed image data, thereby creating a sequence of blocks of uncompressed image data;
resizing by a processor the sequence of blocks of the uncompressed image data along a first axis, thereby creating first axis resized blocks;
resizing by a processor the first axis resized blocks along a second axis, thereby creating first and second axis resized blocks;
storing by a processor the first and second axis resized blocks; and
displaying by a processor the first and second axis resized blocks of uncompressed image data.

9. The method of claim 8, further comprising after the resizing along the first axis:
storing the uncompressed image data that has been resized along the first axis in a first buffer; and
providing the uncompressed image data stored in the first buffer once the buffer has been filled to a first specified amount.

10. The method of claim 9, further comprising after the resizing along the second axis:
storing the uncompressed image data that has been resized along the first axis and the second axis in a second buffer; and
providing the uncompressed image data stored in the second buffer once the buffer has been filled to a second specified amount.

11. The method of claim 8, further comprising after the storing, reordering the uncompressed image data that has been resized along the first axis and the second axis into an order suitable for a display used to view the image.

12. The method of claim 8, wherein the resizing along the first axis comprises resizing blocks of uncompressed image data.

13. The method of claim 12, wherein the blocks of uncompressed image data are of size eight pixels by eight pixels (8×8).

14. The method of claim 8, wherein the image comprises a JPEG compressed image.

15. A method for resizing a first group of pixels of size M to a second group of pixels of size N, the method comprising:
processing by a processor a first pixel from the first group of pixels;
incrementing a counter by N;
in response to a determining that a value in the counter is greater than or equal to M, computing a pixel to be a member of the second group of pixels; subtracting M from the value in the counter; and
repeating the processing, the incrementing, the determining, the subtracting, and the computing for remaining pixels in the first group of pixels.

16. The method of claim 15, wherein the computing comprises computing a mathematical function of the pixels in the first group of pixels processed since a previous subtracting of M from the value in the counter.

17. The method of claim 16, wherein the mathematical function comprises a running average.

18. The method of claim 15, further comprising prior to the processing, resetting the counter to a zero value.

19. The method of claim 15, wherein M is greater than N.

* * * * *